(12) United States Patent
Åsbogård et al.

(10) Patent No.: US 11,021,161 B2
(45) Date of Patent: Jun. 1, 2021

(54) METHOD AND ARRANGEMENT FOR DETERMINING ROAD INCLINATION

(71) Applicant: VOLVO TRUCK CORPORATION, Gothenburg (SE)

(72) Inventors: Mattias Åsbogård, Mölnlycke (SE); Jonas Jerrelind, Hovås (SE); Maud Tribaudeau, Savigny sur Orge (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 329 days.

(21) Appl. No.: 16/318,893

(22) PCT Filed: Jul. 19, 2016

(86) PCT No.: PCT/EP2016/067166
§ 371 (c)(1),
(2) Date: Jan. 18, 2019

(87) PCT Pub. No.: WO2018/014940
PCT Pub. Date: Jan. 25, 2018

(65) Prior Publication Data
US 2019/0263414 A1    Aug. 29, 2019

(51) Int. Cl.
*B60W 40/076*    (2012.01)
*B60W 50/00*    (2006.01)

(52) U.S. Cl.
CPC ..... *B60W 40/076* (2013.01); *B60W 2050/006* (2013.01); *B60W 2050/0022* (2013.01); *B60W 2050/0027* (2013.01); *B60W 2050/0031* (2013.01); *B60W 2510/0657* (2013.01); *B60W 2510/083* (2013.01); *B60W 2520/10* (2013.01);

(Continued)

(58) Field of Classification Search
CPC ........ B60W 40/076; B60W 2050/006; B60W 2050/0022; B60W 2050/0027; B60W 2050/0031; B60W 2510/0657; B60W 2510/083; B60W 2520/10; B60W 2530/10; B60W 2710/1005
See application file for complete search history.

(56) References Cited

U.S. PATENT DOCUMENTS

2008/0249693 A1    10/2008  Kresse
2011/0010060 A1    1/2011   Karlsson
(Continued)

FOREIGN PATENT DOCUMENTS

| FR | 2857444 A1    | 1/2005  |
| JP | 2010-241264 A | 10/2010 |
| WO | 2007045787 A1 | 4/2007  |

*Primary Examiner* — Sze-Hon Kong
(74) *Attorney, Agent, or Firm* — Venable LLP; Jeffri A. Kaminski

(57) ABSTRACT

The invention relates to a method and arrangement for determining a current road inclination, specifically taking into account a quality measure for the determination. The invention also relates to a corresponding computer program product. The method comprises the steps of: —measuring (S1), a first vehicle operating parameter; —receiving (S2) the first vehicle operating parameter; —determining (S3) an indication of a quality level for the first vehicle operating parameter, and —determining (S4) an estimated value of the current road inclination based on the first vehicle operating parameter and the indication of the quality level for the first vehicle operating parameter.

18 Claims, 4 Drawing Sheets

(52) U.S. Cl.
    CPC .  *B60W 2530/10* (2013.01); *B60W 2710/1005* (2013.01)

(56) References Cited

U.S. PATENT DOCUMENTS

| | | | |
|---|---|---|---|
| 2014/0067153 A1 | 3/2014 | Yu | |
| 2014/0297143 A1 | 10/2014 | Söderström et al. | |
| 2015/0183434 A1 | 7/2015 | Adamey et al. | |
| 2016/0082964 A1* | 3/2016 | Chunodkar | B60W 40/076 701/70 |
| 2016/0332633 A1* | 11/2016 | Raffone | G01G 19/086 |
| 2017/0174220 A1* | 6/2017 | Puri | B60W 10/11 |
| 2018/0326852 A1* | 11/2018 | Shiozawa | B60W 30/18127 |
| 2019/0135293 A1* | 5/2019 | Kotteri | B60W 40/076 |

\* cited by examiner

METHOD AND ARRANGEMENT FOR DETERMINING ROAD INCLINATION

TECHNICAL FIELD

The invention relates to a method and arrangement for determining a current road inclination, specifically taking into account a quality measure for the determination. The invention also relates to a corresponding computer program product.

BACKGROUND

Today many vehicles are provided with an automated or automatic transmission for assisting a driver of the vehicle with operating the vehicle and for achieving a desirable fuel economy. Typically, a selected gear for the transmission is dependent on a calculated vehicle mass and a current inclination of the vehicle. To determine the road inclination, it is common to use an inclination sensor, for example integrated in a transmission control unit of the transmission. Such an inclination sensor can be designed in accordance with various working principles.

As understood, the inclusion of the inclination sensor increases the production price of the vehicle, and the accuracy and correct function cannot always be guaranteed, wherein maintenance and repairs of said sensors must be performed.

US20120218094 provides an alternative to the inclusion of an inclination sensor by determining the inclination of a road utilizing at least one existing vehicle operating parameters of the vehicle, such as axle torque, engine rpm, throttle position, and accelerator position. The estimation of the road grade may subsequently be used to a fuel economy calculation and for providing information to the driver of the vehicle relating e.g. manual transmission shifting advising, and acceleration profile advising.

Even though US20120218094 provides an interesting approach to road inclination determination without having to resort to using an inclination sensor, the proposed solution suffers from reliability issues, for example due to the inherent uncertainties relating measurements of the vehicle operating parameters. This will in turn have impact on e.g. selection of the correct gear under specific circumstances.

US2015/183434 A1, WO2007/045787 A1, US2008/249693 and US2016/082964 A1 each discloses further arrangements relating to estimation of road inclination.

FR2857444 A1 discloses an example where the estimation of the road inclination uses a statistical model for the vehicle depending on the noise level (that is quality level) for estimated and input data.

Accordingly, it would be desirable to provide further enhancements within the technical area of inclination determination without using an inclination sensor, specifically by introducing means for circumventing the prior art reliability problems as exemplified above.

SUMMARY

According to an aspect of the present disclosure, the above is at least partly alleviated by a method for on-board determination of an estimated value of a road inclination of a road currently driven by a vehicle, the vehicle comprising at least a first sensor configured to measure a first vehicle operating parameter for the vehicle, and an electronic control unit (ECU) arranged in communication with the first sensor, wherein the method comprises the steps of measuring, using the first sensor, the first vehicle operating parameter, receiving, at the ECU, the first vehicle operating parameter, determining, at the ECU, an indication of a quality level for the first vehicle operating parameter, and determining, at the ECU, the estimated value of the current road inclination based on the first vehicle operating parameter and the indication of the quality level for the first vehicle operating parameter.

In accordance to the present disclosure, the on-board determination of the estimated value relating to the road inclination is further enhanced by the analysis and introduction of a quality measure for the estimated value that will further improve how the estimated road inclination value can be used and should be treated by on-board vehicle processes making use of the estimated road inclination value. For example, in case there is an indication that the quality measure for a specific estimated value has an in comparison low quality, this may be taken into account when further operating the vehicle, such as for example when deciding how to operate the transmission of the vehicle. Accordingly, the inherent unreliability relating to an inclination determination without using an inclination sensor may elegantly be countered as the subsequent decision making (such as gear selection) may be made "with open eyes" and not bluntly relying on the estimated road inclination value.

Furthermore, a dead reckoning is used for generating an "intermediate" estimated road inclination value in case the quality level is determined to be below the threshold.

Preferably, the disclosed method further comprises the step of comparing, at the control unit, the quality level with a threshold, wherein the determination of the estimated value of the current road inclination is further based on a result of the comparison. Thus, it may be possible to allow to integrate the quality value with the estimated road inclination value such that the road inclination value is "tagged" (explicitly or implicitly) with the quality level or adapt the actual determination of the estimated road inclination value. For example, in case a low quality level (i.e. below the threshold) is determined and the estimated road inclination value is subsequently to be used for gear selection, the determination process for the road inclination may be adapted such that a somewhat larger road inclination value is provided to the gear selection mechanism, whereby as a consequence a lower gear typically will be selected (as compared to if an in comparison lower road inclination value had been provided).

The threshold may be set statically or dynamically, for example for each "category" of vehicle operating parameters. The threshold may in some embodiments of the invention be set based on previously captured (real) data, statistical models for a specific type of vehicle operating parameter, etc., where the threshold is set to correspond to a "realistic" e.g. level or range for the specific vehicle operating parameter.

In an embodiment of the invention, the vehicle comprises an engine or electrical machine and the at least first sensor is configured to measure a representation of a torque for the engine or electrical machine, respectively. That is, the vehicle may be any of e.g. a pure gas, gasoline or diesel vehicle, a hybrid vehicle or a vehicle purely relying on electricity for propelling the vehicle. It should be understood that the first sensor not necessarily must be arranged to directly measure the torque, but rather may be a sensor (e.g. in case of the electrical machine) used for measuring/determining/estimating an intermediate operating current, whereby the ECU may be used for estimating the torque based on the intermediate operating current.

Alternatively, the at least first sensor may be configured to measure a representation of a vehicle speed. In line with the above discussion, the sensor must not necessarily, directly measure the speed of the vehicle, but rather a sensor generating a measurement value that subsequently is used for estimating the vehicle speed. Still further, the at least first sensor may also be configured to measure a representation of vehicle acceleration or to measure a representation of a vehicle weight. Thus, the expression "sensor" should be interpreted broadly and relate to any type of element (component) comprised with the vehicle that may measure/generate a vehicle operating parameter to be used in accordance with the method for determination of the estimated road inclination value.

In a preferred implementation, the vehicle further comprises a second sensor configured to measure a second vehicle operating parameter for the vehicle, whereby an in comparison higher reliability may be achieved by using at least two separate sources for measuring different vehicle operating parameters. In addition, in some situations it may be so that one of the first and the second sensor may be generating measurement values having a high quality level whereas the other sensor generates measured values having an in comparison low quality level. In this case, it may be possible to adapt the determination process such that only the sensor generating high quality measurements will be included.

It may also in line with this discussion be possible to include a weighting factor, typically allowing sensor measurements having low quality to have less influence on the estimated road inclination value. Thus, generally speaking, sensor values from both the first and the second sensor will typically be used for determining the estimated road inclination value, and accordingly the determination of the estimated value of the current road inclination is additionally based on the second vehicle operating parameter and an indication of a quality level for the second vehicle operating parameter.

In accordance to the present disclosure, the step of determining the indication of the quality level for the first vehicle operating parameter further comprises comparing the first vehicle operating parameter with a predefined range for the first vehicle operating parameter. Thus, in case the vehicle operating parameter is "way out of range", this may be seen as an indicator that the quality level of the vehicle operating is in comparison low.

Advantageously, the method further comprises continuously measuring the first vehicle operating parameter, and determining a trend based on a plurality of measured first vehicle operating parameters measured over a time interval. That is, it is advantageous to include statistical estimations relating to the operating parameters, and possibly the estimated road inclination value. Accordingly, even if low quality measurements are generated by e.g. the first sensor (or related equipment), the overall estimation of the road inclination value may be provided with a relatively high quality level, as previous behavior of the operating parameters/road inclination/vehicle is taken into account.

Further sensor information may be used (received by the ECU) for determining the estimated road inclination value, such as e.g. from a Global Navigation Satellite System receiver (GNSS, e.g. GPS, etc.) comprised with vehicle. The ECU may also be configured to acquire map data from a storage device comprised with the vehicle. The map data may be permanently of intermediately stored in the vehicle. When stored in an intermediate fashion, the map data may be acquired "on the go" from a remote/cloud server.

According to another aspect of the present disclosure there is provided an on-board arrangement for a vehicle, the arrangement provided for determining of an estimated value of a road inclination of a road currently driven by the vehicle, wherein the arrangement comprises at least a first sensor configured to measure a first vehicle operating parameter for the vehicle, and an electronic control unit (ECU) arranged in communication with the first sensor, wherein the ECU is further configured to receive the first vehicle operating parameter from the first sensor, determine an indication of a quality level for the first vehicle operating parameter, and determine the estimated value of the current road inclination based on the first vehicle operating parameter and the indication of the quality level for the first vehicle operating parameter. This aspect of the invention provides similar advantages as discussed above in relation to the previous aspect of the invention.

According to a further aspect of the present disclosure there is provided a computer program product comprising a non-transitory computer readable medium having stored thereon computer program means for operating an on-board arrangement for a vehicle, the arrangement provided for determining of an estimated value of a road inclination of a road currently driven by the vehicle, wherein the arrangement comprises at least a first sensor configured to measure a first vehicle operating parameter for the vehicle, and an electronic control unit (ECU) arranged in communication with the first sensor, wherein the computer program product comprises code for receiving the first vehicle operating parameter, code for determining an indication of a quality level for the first vehicle operating parameter, and code for determining the estimated value of the current road inclination based on the first vehicle operating parameter and the indication of the quality level for the first vehicle operating parameter. Also this aspect of the invention provides similar advantages as discussed above in relation to the previous aspects of the invention.

The computer readable medium may be any type of memory device, including one of a removable nonvolatile random access memory, a hard disk drive, a floppy disk, a CD-ROM, a DVD-ROM, a USB memory, an SD memory card, or a similar computer readable medium known in the art.

Further advantages and advantageous features of the invention are disclosed in the following description and in the dependent claims.

BRIEF DESCRIPTION OF THE DRAWINGS

With reference to the appended drawings, below follows a more detailed description of embodiments of the present disclosure cited as examples.

In the drawings.

DETAILED DESCRIPTION OF EXAMPLE EMBODIMENTS OF THE INVENTION

Figure 1A:
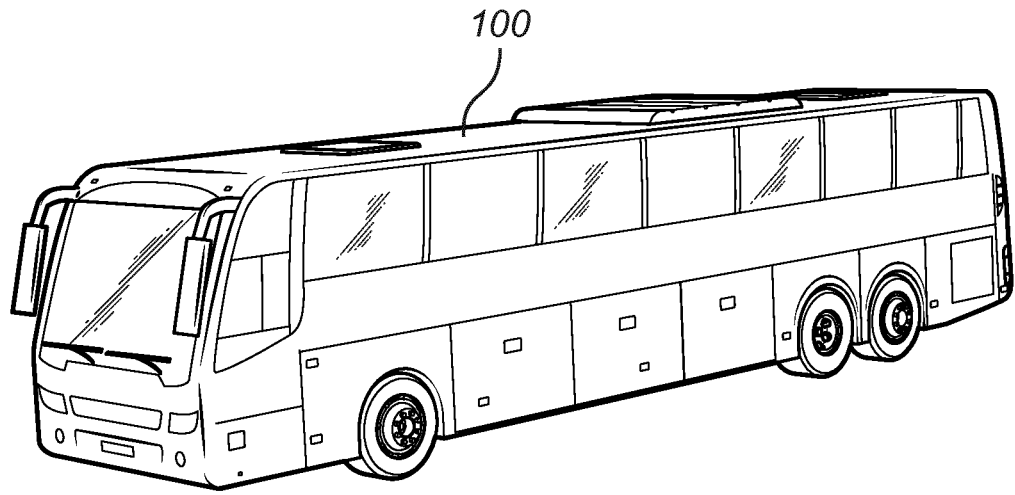
FIG. 1a illustrates a bus and 1b a truck in which an inclination estimation arrangement according to the present disclosure may be incorporated.

The present invention will now be described more fully hereinafter with reference to the accompanying drawings, in which currently preferred embodiments of the present disclosure are shown. This invention may, however, be embodied in many different forms and should not be construed as limited to the embodiments set forth herein; rather, these embodiments are provided for thoroughness and completeness, and fully convey the scope of the invention to the skilled addressee. Like reference characters refer to like elements throughout.

Figure 1B:
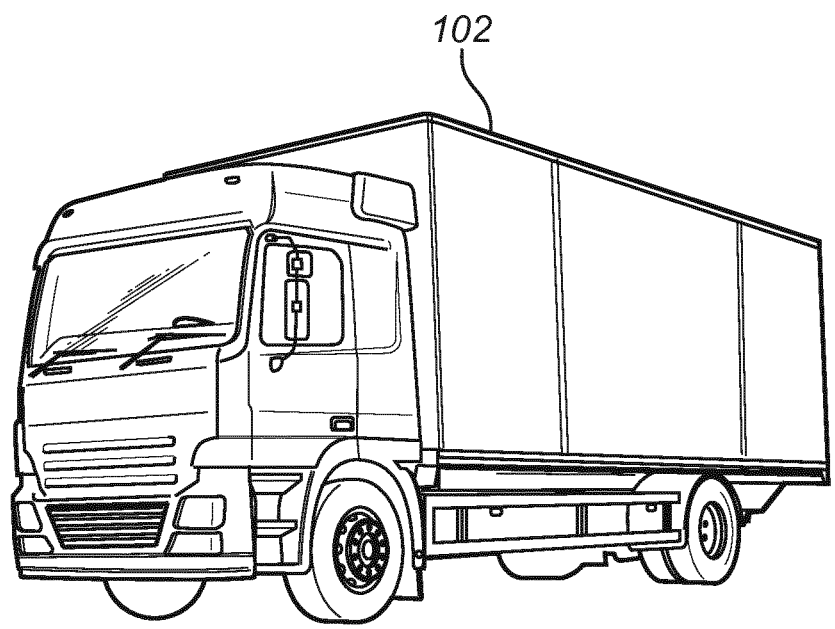
Figure 2:
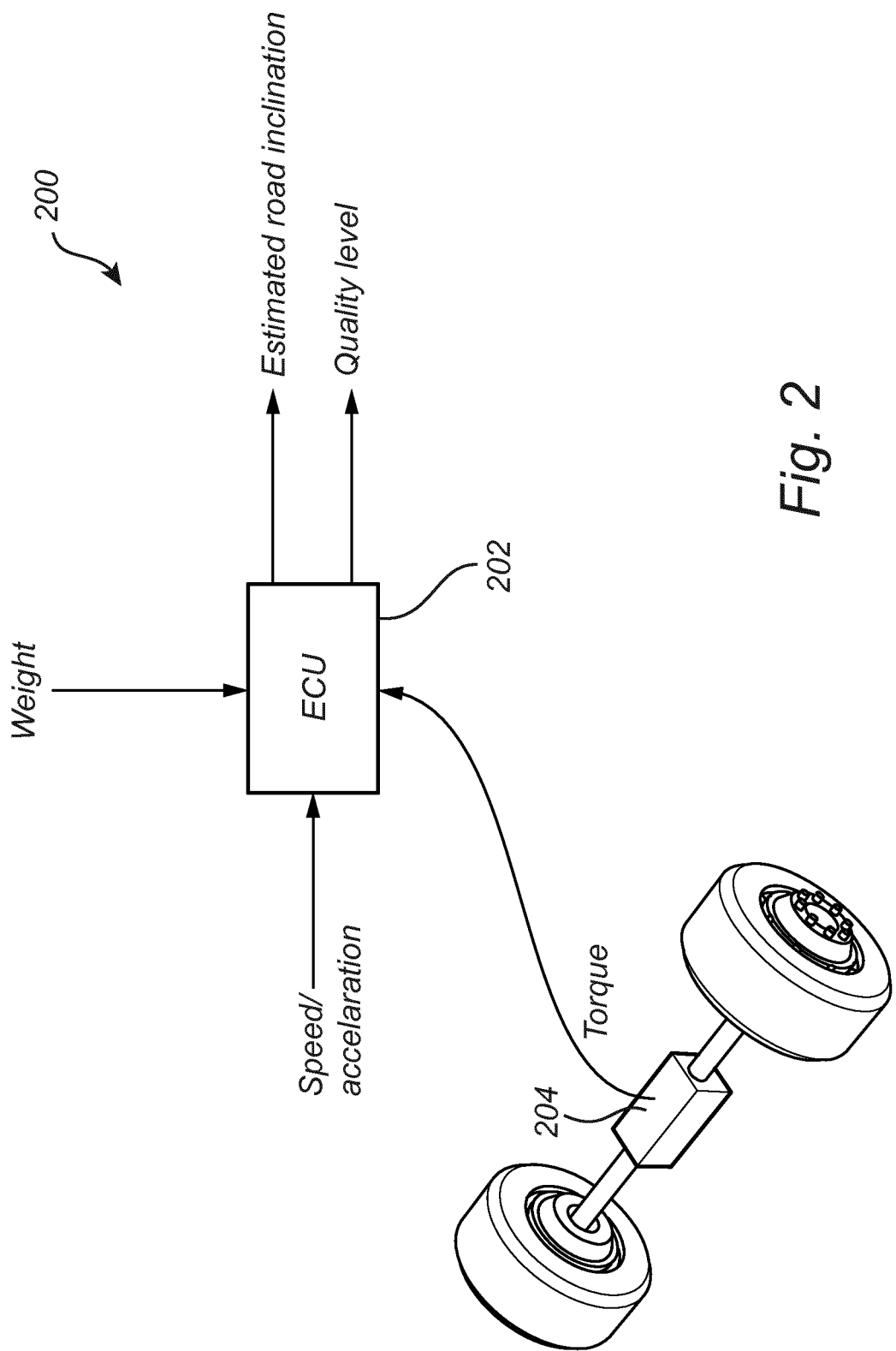
FIG. 2 conceptually shows an inclination estimation arrangement according to an embodiment of the present disclosure.

Referring now to the drawings and to FIGS. 1 and 2 in particular, there is in FIG. 1a depicted an exemplary vehicle, here illustrated as a bus 100, in which an inclination estimation arrangement 200 according to the present invention may be incorporated. The inclination estimation arrangement 200 may of course be implemented, possibly in a slightly different way, in a truck 102 as shown in FIG. 1b, a car, etc. The vehicle is preferably an electric or a hybrid vehicle, or possibly a gas/gasoline/diesel vehicle. The vehicle comprises an electric machine (in case of being an electric or hybrid vehicle) or an engine (such as an internal combustion engine).

The inclination estimation arrangement 200 comprises an electronic control unit (ECU) 202, where the ECU 202 is configured to receive information from components and/or sensors comprised with the bus 100. Such information will typically include information/data/measurement values from at least first sensor 204 configured to measure a representation of e.g. a torque for the engine or electrical machine comprised with the vehicle 100/102. An electric or hybrid vehicle will further comprise a battery for powering of the electric machine.

The ECU 202 may also be arranged to receive information/data/measurement values from further sensors, e.g. configured to measure a representation of a vehicle speed, configured to measure a representation of vehicle acceleration, and/or configured to measure a representation of a weight of the vehicle. As understood, the ECU may be configured to receive/acquire information from any components/sensors or similar equipment configured to generate a representation of different vehicle operating parameters (such as the mentioned torque, weight, speed, acceleration, etc.) to be used in the process of determining the estimated road inclination, as outlined below.

The ECU 202 may include a general-purpose processor, an application specific processor, a circuit containing processing components, a group of distributed processing components, a group of distributed computers configured for processing, etc. The processor may be or include any number of hardware components for conducting data or signal processing or for executing computer code stored in memory. The memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

The ECU 202 is typically connected to e.g. a communication interface (such as e.g. a CAN bus or similar, or a dedicated communication interface) of the bus 100 or truck 102, for allowing communication with the vehicle components and/or sensors as mentioned above. Further, other electronic devices may be connected to the ECU 202, including for example arrangements for determination of the position of the bus 100 or truck 102, such as for example the above mentioned GPS receiver (global positioning system, or similar) combined with the mentioned map information, e.g. stored in a local or remote database, and/or e-horizon data stored with the bus 100 or truck 102. The map/e-horizon data may comprise information relating to for example, type of road, and number of traffic lanes and/or any static obstacles on the road. In addition, the ECU 202 is preferably arranged to receive information/data/measurement values relating to vehicle operating parameters relating to braking of the vehicle, road friction, gear selection (transmission), etc.

In a possible implementation of the present disclosure, the estimation of the road inclination may for example be determined in accordance to the equations below.

Road inclination in percent:

$$Inc_{Road} = 100 \times \left( \frac{F_{Trac} - F_{Road} - ma}{mg} \right) \text{ [\%], valid up to 20\%}$$

$$Inc_{Road} = 100 \times \tan^{-1}\left( \frac{F_{Trac} - F_{Road} - ma}{mg} \right) \text{ [\%]}$$

Where:
$F_{Trac}$=Sum of traction force at driven wheels
$F_{Road}$=Acting road and air resistance on the vehicle, at current vehicle speed on flat road and no wind
m=Estimated vehicle weight (known, based on sensor information)
a=Calculated vehicle acceleration (known, based on sensor information)
g=Gravity constant (known, assumed constant while on planet earth)

$$F_{Trac} = \frac{T_{Prop} \times n_{FD} \times n_{Gear} \times \mu_{Gear} - T_{brake}}{r_{Wh}}$$

$$F_{Road} = mg\varphi_{Road} + \rho_{Air}C_d A \frac{v_{Veh}^2}{2} [N]$$

Where:
$T_{Prop}$=Total propulsion torque—positive, or negative if electric braking (estimate available)
$T_{brake}$=Foundation brake torque—zero if foundation brake not used (estimate available)
$n_{FD}$=Gear ratio of final drive (known),
$n_{Gear}$=Gear ratio of current gear (known)
$\mu_{Gear}$=Efficiency of gearbox at current speed, temp and torque (estimate available)
$r_{wh}$=Wheel radius of driven wheels (known)
$\varphi_{Road}$=Road rolling friction coefficient (estimate available)
$\rho_{air}$=Air density [kg/m$^3$] (known)

$C_d$=Air drag coefficient (estimate available)
A=Area of vehicle vertical to movement direction [m$^2$] (known)
$v_{Veh}$=Vehicle speed [m/s] (known, measured by sensor)

Some situations exist, as mentioned above, where it may be problematic to make a high quality determination of the road inclination (i.e. being below the threshold), as is further elaborated below.

However, in some situations when standard estimation methods for the road inclination does not work, e.g. due to reasons described above, the last known inclination will be frozen and worst case inclination will be calculated based on dead reckoning and road-statistics.

In accordance to the present disclosure, it is thus possible to use statistical data on maximum road inclination change rate versus road speed limit to derive a look-up table:

$$\dot{Inc}_{RoadWorstCase}(t) = f(v_{Veh}(t))$$

It could possibly be made multi-dimensional (i.e. considering aspects other than vehicle speed). It could also be adaptive, based on information gathered by the vehicle itself. The worst-case road inclination then becomes:

$$Inc_{RoadWorstCase}(t) = Inc_{RoadLastCalc} + \int_{t_{hold}}^{t} \dot{Inc}_{RoadWorstCase}(t)dt$$

Where:
$InC_{RoadLastCalc}$=Last calculated road inclination,
$t_{hold}$=Time when the last valid road inclination value was calculated An example of a determination of determination of the estimated value of road inclination of a road currently driven by the bus 100 or truck 102 is exemplified in FIGS. 3a and 3b. The description is also given in conjunction to FIG. 4.

Figure 3A:
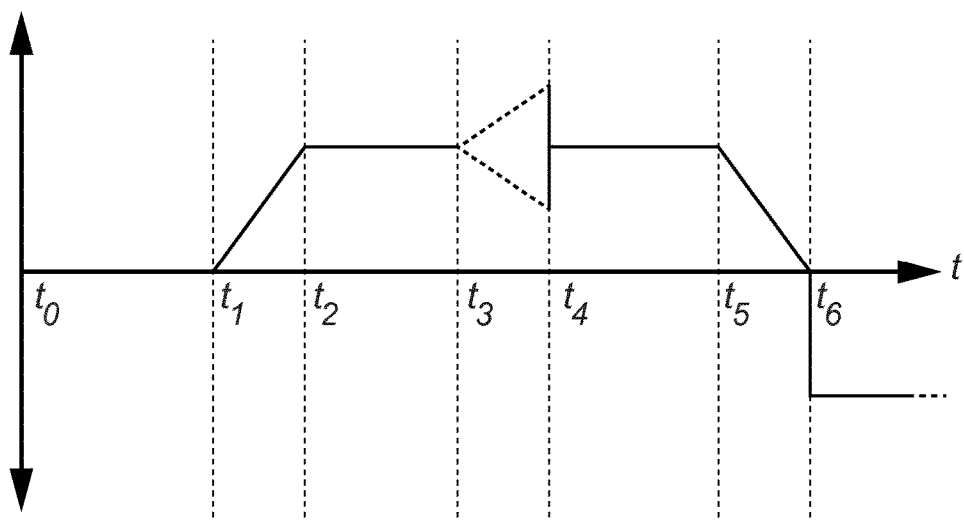
FIGS. 3a and 3b exemplifies, in a diagram, an exemplary relation between determination of the road inclination and the quality level.
Figure 4:
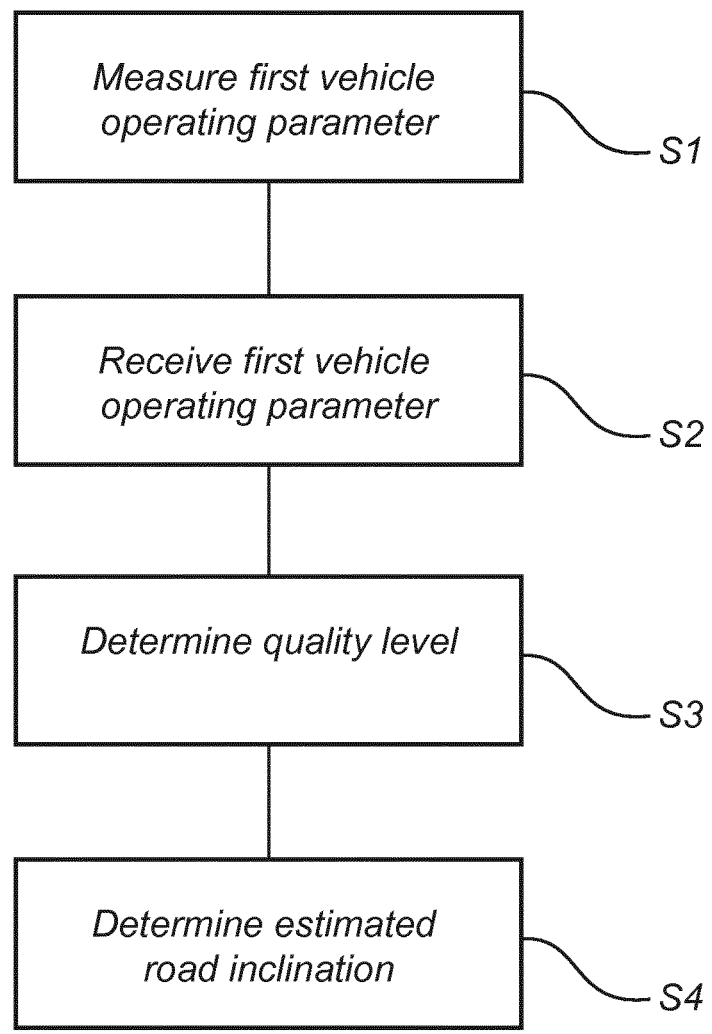
FIG. 4 illustrates the processing steps for performing the method according to the present disclosure.

In the illustrated example and as shown in FIG. 3a, the bus 100 is travelling along a flat road at between $t_0$ and $t_1$. For example, the sensor 204 will measure, S1, a representation of a torque for the electrical machine. The ECU 202 will in turn receive, S2, the representation and determine, S3, a quality level for the measurement value (defined as the vehicle operating parameter). As indicated above, the determination of the quality level may be based on the vehicle operating parameter being within a predefined (reasonable range) or for example based on a noise level for the vehicle operating parameter. As an example, a noisy vehicle operating parameter may be seen as having an in comparison low quality level. The ECU 202 will also determine, S4, the estimated value of the current road inclination in a manner as exemplified above and based on the vehicle operating parameter (e.g. representation of current torque) and the quality level.

Figure 3B:
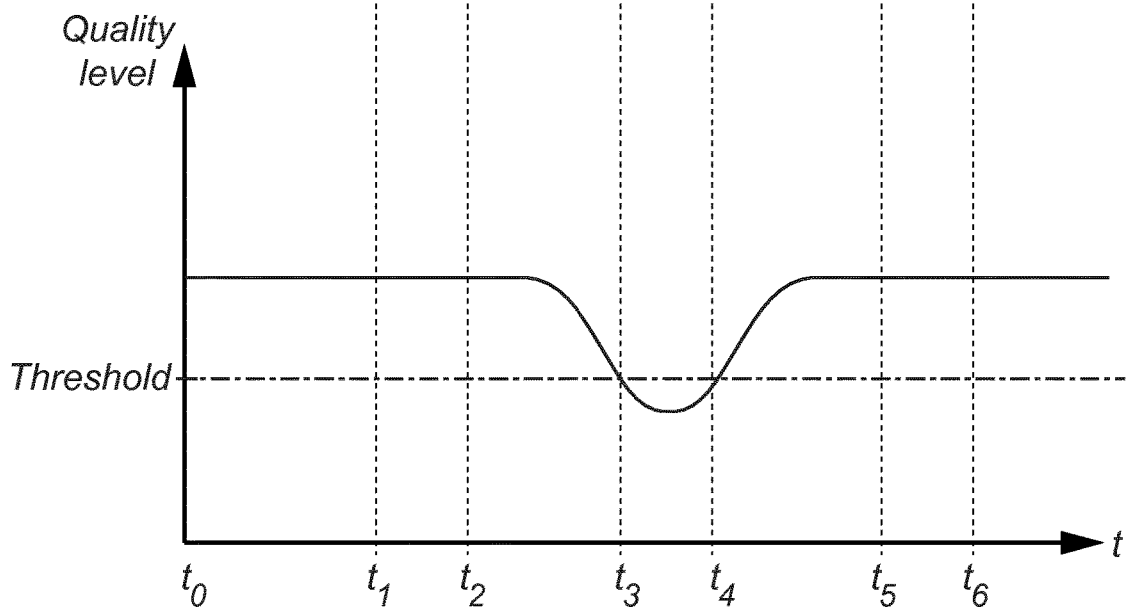

In this example, the ECU 202 has determined that the current road inclination is zero and that the quality level is above the indicated threshold value as seen in FIG. 3b.

At $t_1$ the bus 100 reaches a hilly section and starts to initiate travelling uphill. Accordingly, the ECU 202 determines that the current road inclination is increasing and that the quality level is still above the threshold. At t2, the bus 102 is heading steady uphill at a constant inclination. However, slightly before t3 the quality level is shown to decrease, and at t3 the quality level has reached below the threshold.

Accordingly, as the road inclination has reached below the threshold, an alternative inclination estimation is generated by the ECU 202, as is indicated by the dotted lines between $t_3$ and $t_4$. For example, and as shown in FIG. 3a, the ECU 202 may be configured to generate an estimated maximum road inclination value and a minimum road inclination value. Typically, the maximum and minimum value is determined based on at least one of dead reckoning and a statistical model for a behavior of the vehicle or vehicle operating parameter. For example, it may be possible to set further boundary conditions for how the inclination likely will change over time. Furthermore, in a typical implementation the maximum and minimum values will have an increasing divergence over time.

However, in the example, somewhere between $t_3$ and $t_4$ the quality level is again increasing and at $t_4$ the quality level is determined to have exceeded the threshold. Thus, instead of generating the maximum and minimum values the ECU 202 will again provide only a single estimated value of the current road inclination.

At $t_5$ the bus 100 has reached the top of the hill and the ECU 202 determines that the road inclination is decreasing towards zero. Subsequently, at $t_6$ the bus 102 is starting to travel downhill, whereby the ECU 202 will determine a negative estimated value of the current road inclination.

As understood from the above, for example an automatic transmission comprised with the bus 100 (or truck 102) may be controlled based on the estimated value of the current road inclination. At the time of the quality level being below the threshold, the transmission may advantageously be controlled using the estimated maximum road inclination value, whereby a safer gear selection may be made (typically by selecting an in comparison lower gear, such as by selecting the lowest available gear). Similarly, e.g. an electric braking (recuperation) arrangement may be controlled in case the estimated value of the current road inclination is determined to be negative (downslope).

In summary, the present invention relates to a method for on-board determination of an estimated value of a road inclination of a road currently driven by a vehicle, the vehicle comprising at least a first sensor configured to measure a first vehicle operating parameter for the vehicle, and an electronic control unit (ECU) arranged in communication with the first sensor, wherein the method comprises the steps of measuring, using the first sensor, the first vehicle operating parameter, receiving, at the ECU, the first vehicle operating parameter, determining, at the ECU, an indication of a quality level for the first vehicle operating parameter, and determining, at the ECU, the estimated value of the current road inclination based on the first vehicle operating parameter and the indication of the quality level for the first vehicle operating parameter.

Advantages with the invention includes the possibility of making safe decisions even in cases where the quality level of the estimated value of road inclination is considered low, by including the quality level or an indication thereof with the estimated level.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor.

By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data that cause a general-purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art.

Variations to the disclosed embodiments can be understood and effected by the skilled addressee in practicing the claimed invention, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A method for on-board determination of an estimated value of a road inclination of a road currently driven by a vehicle, the vehicle comprising:
    at least a first sensor configured to measure a first vehicle operating parameter for the vehicle, and
    an electronic control unit (ECU) arranged in communication with the first sensor, characterized where the method comprises the steps of:
    measuring (S1), using the first sensor, the first vehicle operating parameter;
    receiving (S2), at the ECU, the first vehicle operating parameter;
    determining (S3), at the ECU, an indication of a quality level for the first vehicle operating parameter, and
    determining (S4), at the ECU, the estimated value of the current road inclination based on the first vehicle operating parameter and the indication of the quality level for the first vehicle operating parameter, and characterized by the further steps of
    comparing, at the ECU, the quality level with a threshold, wherein the determination of the estimated value of the current road inclination is further based on a result of the comparison, and wherein the estimated value of the current road inclination is based on a dead reckoning for the vehicle if the quality level is determined to be below the threshold.

2. The method according to claim 1, wherein the vehicle comprises an engine or electrical machine and the at least first sensor is configured to measure a representation of a torque for the engine or electrical machine, respectively.

3. The method according to claim 1, wherein the at least first sensor is configured to measure a representation of a vehicle speed.

4. The method according to claim 1, wherein the at least first sensor is configured to measure a representation of a vehicle acceleration.

5. The method according to claim 1, wherein the at least first sensor is configured to measure a representation of a vehicle weight.

6. The method according to claim 1, wherein the vehicle comprises a second sensor configured to measure a second vehicle operating parameter for the vehicle.

7. The method according to claim 6, wherein the determination of the estimated value of the current road inclination is additionally based on the second vehicle operating parameter and an indication of a quality level for the second vehicle operating parameter.

8. The method according to claim 7, further comprising the steps of:
    correlating the quality level for the first vehicle operating parameter with the quality level for the second vehicle operating parameter, and
    determining a weighting factor based on a result of the correlation,
wherein the determination of the estimated value of the current road inclination further takes into account the weighting factor.

9. The method according to claim 1, wherein the step of determining the indication of the quality level for the first vehicle operating parameter further comprises:
    comparing the first vehicle operating parameter with a predefined range for the first vehicle operating parameter.

10. The method according to claim 1, further comprising the step of:
    operating the vehicle based on the estimated value of the current road inclination.

11. The method according to claim 10, wherein the vehicle comprises a transmission and the operation of the vehicle includes shifting between different gears.

12. The method according to claim 11, wherein if the quality level is below the threshold, a low gear or lowest available gear is selected.

13. The method according to claim 1, further comprising:
    continuously measuring the first vehicle operating parameter, and
    determining a trend based on a plurality of measured first vehicle operating parameters measured over a time interval.

14. An on-board arrangement for a vehicle, the arrangement provided for determining of an estimated value of a road inclination of a road currently driven by the vehicle, wherein the arrangement comprises:
    at least a first sensor configured to measure a first vehicle operating parameter for the vehicle, and
    an electronic control unit (ECU) arranged in communication with the first sensor, where the ECU is configured to:
    receive the first vehicle operating parameter from the first sensor;

determine an indication of a quality level for the first vehicle operating parameter, and determine the estimated value of the current road inclination based on the first vehicle operating parameter and the indication of the quality level for the first vehicle operating parameter, and characterized in that the ECU is further configured to:

compare the quality level with a threshold, wherein the determination of the estimated value of the current road inclination is further based on a result of the comparison, and wherein the estimated value of the current road inclination is based on a dead reckoning for the vehicle if the quality level is determined to be below the threshold.

15. The arrangement according to claim 14, wherein the at least first sensor is configured to measure a representation of at least one of a torque, a vehicle speed, a vehicle acceleration, or a vehicle weight.

16. The arrangement according to claim 14, wherein the ECU is further configured to operate the vehicle based on the estimated value of the current road inclination.

17. A vehicle, comprising the arrangement according to claim 14.

18. A computer program product comprising a non-transitory computer readable medium having stored thereon computer program means for operating an on-board arrangement for a vehicle, the arrangement provided for determining of an estimated value of a road inclination of a road currently driven by the vehicle, wherein the arrangement comprises:

at least a first sensor configured to measure a first vehicle operating parameter for the vehicle, and an electronic control unit (ECU) arranged in communication with the first sensor, wherein the computer program product comprises:

code for receiving the first vehicle operating parameter;

code for determining an indication of a quality level for the first vehicle operating parameter;

code for determining the estimated value of the current road inclination based on the first vehicle operating parameter and the indication of the quality level for the first vehicle operating parameter, and code for comparing, at the ECU, the quality level with a threshold, wherein the determination of the estimated value of the current road inclination is further based on a result of the comparison, and wherein the estimated value of the current road inclination is based on a dead reckoning for the vehicle if the quality level is determined to be below the threshold.

* * * * *